April 20, 1937.   C. E. QUICK   2,077,897
MOLDER KNIFE DEVICE
Filed March 12, 1936
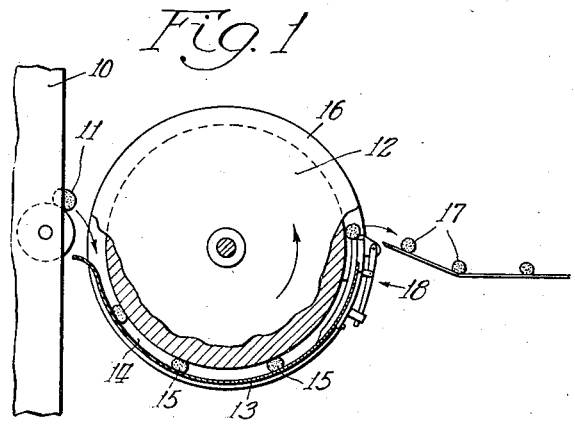
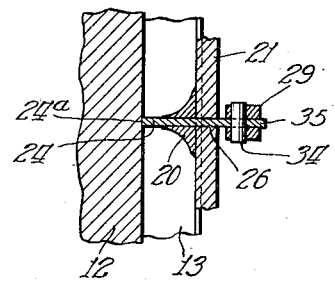
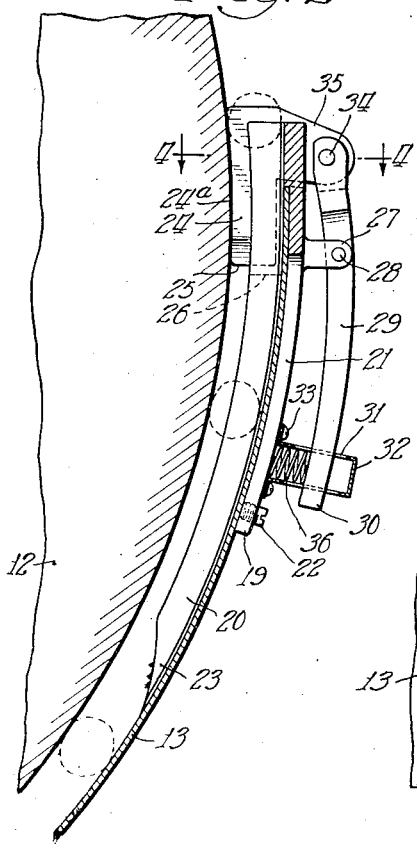
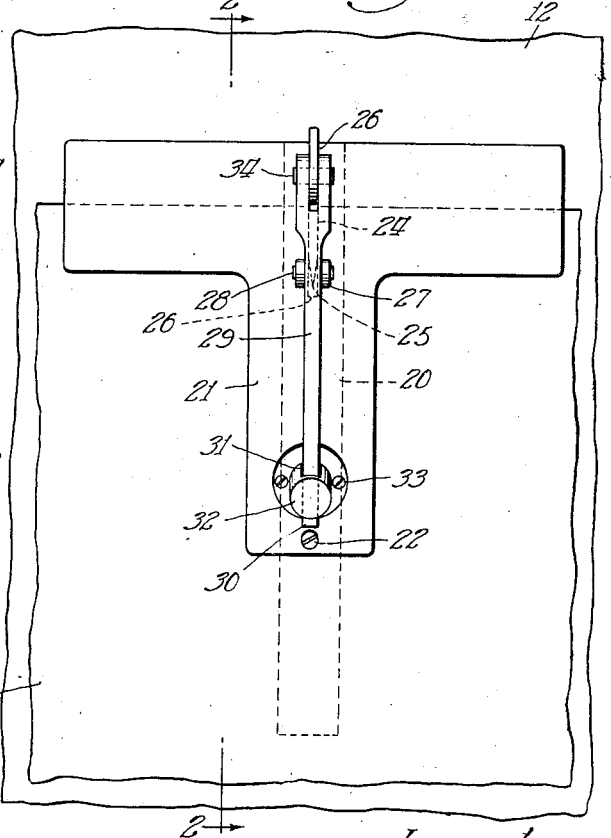
Inventor:
Claude E. Quick
By: A. Trevor Jones, Atty.

Patented Apr. 20, 1937

2,077,897

UNITED STATES PATENT OFFICE 2,077,897

MOLDER KNIFE DEVICE

Claude E. Quick, Glendale, Calif., assignor to Western Bakeries Corporation, Ltd., Los Angeles, Calif., a corporation of California Application March 12, 1936, Serial No. 68,461

4 Claims. (Cl. 107—9)

This invention relates to a molder knife device more particularly for bakery machines dealing with dough before baking.

Among other objects, the invention aims to provide an improved device for this use which is readily assembled or disassembled and which is automatically maintained in operative position.

Other objects and advantages will be apparent from the following description taken together with the accompanying drawing, in which—

Figure 1 is a side view partially in section and somewhat diagrammatic, showing the device with its associated mechanisms;

Figure 2 is an enlarged side view, also partially in section taken on the line 2—2 of Fig. 3, showing details of the device;

Figure 3 is a view looking at the structure of Fig. 2 from the right; and

Figure 4 is a partial sectional view taken on the line 4—4 of Fig. 2.

In the illustrated structure, the numeral 10 indicates generally a molder or the like for treating dough to produce elongated rolls of the latter, such as shown at 11. Customarily the roll 11 is further reduced in diameter, while being elongated by the molding drum 12 in cooperation with the pressure-plate 13; that is, as best shown in Fig. 1, the rolls of dough 11 enter a space 14 formed about the lower half of the drum 12 by the arcuate pressure plate 13, this space being such as to further mold the dough to the form indicated at 15 in which the roll is reduced in diameter and elongated as limited by the flanges 16 on the ends of the drum 12. Since the drum 12 revolves counterclockwise, the rolls of dough 15 are impelled toward the right-hand or discharge end of the space 14, at which end they are next treated to sever the rolls 15 into two lengths, each for an individual loaf of bread, for example, and substantially one-half of the previous length of the roll, as indicated at 17, this operation being performed by the device indicated generally by the numeral 18 and which, in accordance with my invention, is desirably constructed as next described.

The pressure plate 13 carries, as here shown, the divider web attachment 19 which may comprise a somewhat knife-like web 20 lying about the inner face of the pressure plate 13 in the vicinity of its discharge end and midway between the flanges 16 on the ends of the drum. To retain this web in place, I have shown it welded to a retainer plate 21 lapping the outer face of the pressure plate 13, that is, the pressure plate being snugly received between the web 20 and the retainer plate 21, the web and retainer plate being welded together just above the edge of the pressure plate. A set screw 22 passing through the retainer plate may then be tightened against the pressure plate to enhance the security of the attachment. The lower or inner end 23 of the web 20 is desirably somewhat pointed so that as the rolls of dough 15 come in contact therewith the dividing of the dough is begun, it being later completely severed by the molder knife 24 just as the rolls leave the drum.

In accordance with my invention, the knife 24, having its lower or inner end 25 sharpened to a knife edge, is carried in a slot 26 jointly formed in the retainer plate 21 and the web 20 just above the edge of the pressure plate, to have its face 24a, which is of slightly arcuate formation, pressed against the revolving face of the drum 12. For this purpose I have shown a fulcrum 27 formed integrally with the retainer plate 21 and to which is pivoted as at 28 the lever 29. In this instance, the downwardly depending long arm 30 of the lever passes movably through a slot 31 in the spring barrel 32 secured to the retainer plate 21 as by the screws 33. The upper or shorter end of the lever is shown bifurcated and has pivoted thereto as at 34 between its bifurcations the arm 35 which is integral with the knife 24. A compression spring 36 within the spring barrel 32 presses upon the arm 30 of the lever 29 which moves the bifurcated end of the lever inwardly toward the drum 12 carrying with it the knife 24.

Thus the knife will be free to move to adjust itself to the rotation of the drum and while maintaining contact therewith, is prevented from working upwardly out of position. Also, the knife is readily attachable or removable with the expenditure of a minimum amount of time and labor.

Having described my invention, I claim:

1. In a molder knife device, the combination with a revolving drum and an arcuate pressure plate spaced therefrom, of a divider web attachment carried by the pressure plate at the discharge end thereof, a knife disposed between the drum and the pressure plate, and means carried by the web attachment pressing the knife against the drum.

2. The structure of claim 1 wherein the said means includes a lever carrying the knife at one end and spring pressed at the other end.

3. The structure of claim 1 wherein the said means includes a fulcrum, a lever pivoted to the fulcrum, a slotted spring barrel receiving one end of the lever movably therethrough, the other end of the lever carrying the knife, and a compression spring in the barrel.

4. In a molder knife device, the combination with a revolving drum and an arcuate pressure plate spaced therefrom, of a knife having its cutting edge normal to the surface of the drum disposed between the drum and the pressure plate, and spring means carried by the pressure plate pressing the knife laterally against and into frictional engagement with the working surface of the drum, the knife where pressed laterally against the drum having a face of arcuate formation to accommodate the curved periphery of the drum.

CLAUDE E. QUICK.